United States Patent

Müntnich et al.

[11] Patent Number: 5,879,086
[45] Date of Patent: Mar. 9, 1999

[54] AXIAL ROLLING BEARING

[75] Inventors: Leo Müntnich, Aurachtal; Herbert Zettner, Herzogenaurach, both of Germany

[73] Assignee: Ina Walzlager Schaeffler KG, Germany

[21] Appl. No.: 926,315

[22] Filed: Sep. 5, 1997

[30] Foreign Application Priority Data

Nov. 9, 1996 [DE] Germany .................. 196 46 338.6

[51] Int. Cl.[6] .................................................. F16C 33/46
[52] U.S. Cl. .............................................. 384/621; 384/623
[58] Field of Search .................... 384/470, 607, 384/611, 612, 614, 618, 620, 621, 623

[56] References Cited

U.S. PATENT DOCUMENTS

| | | | |
|---|---|---|---|
| 3,414,341 | 12/1968 | Murphy | 384/621 X |
| 4,296,979 | 10/1981 | Hofmann et al. | 384/453 |
| 4,413,866 | 11/1983 | Geisey | 384/623 X |
| 4,953,993 | 9/1990 | Bahr | 384/623 |
| 4,981,373 | 1/1991 | Bando | 384/620 |
| 5,352,047 | 10/1994 | Ingall et al. | 384/572 |
| 5,474,390 | 12/1995 | Rhoads | 384/623 |

FOREIGN PATENT DOCUMENTS

| | | | |
|---|---|---|---|
| 1773605 | 6/1958 | Germany . | |
| 3917128 | 11/1990 | Germany . | |
| 4040414 | 7/1992 | Germany | 384/618 |
| 4435593 | 4/1996 | Germany . | |
| 19618216 | 12/1996 | Germany . | |
| 2115889 | 9/1983 | United Kingdom . | |

Primary Examiner—Thomas R. Hannon
Attorney, Agent, or Firm—Bierman, Muserlian and Lucas

[57] ABSTRACT

An axial rolling bearing with a cage (2) comprising radially directed elastic projections (7, 8) on its inner and/or outer peripheral surface, which elastic projections (7, 8) bear against the collar (6, 5) of the race discs (4, 3) under all operating conditions of the bearing so that the cage (2) is radially centered, even if the shaft lifts off in axial direction.

8 Claims, 1 Drawing Sheet

U.S. Patent    Mar. 9, 1999    5,879,086

AXIAL ROLLING BEARING

FIELD OF THE INVENTION

An axial rolling bearing comprising rolling elements arranged in a cage, and at least one race disc which merges at one peripheral edge into an axially directed collar engaging over the cage with play.

BACKGROUND OF THE INVENTION

An axial rolling bearing of the pre-cited type is known from U.S. Pat. No. 2,891,828 which rolling bearings are often used in converters of automatic transmissions. Under certain operating conditions, the so-called shaft-locating disc lifts off the rolling elements with the result that, the bearing being open, the cage and the disc are displaced radially, excentric to the axis. It is only on commencement of rotation in the operating state that the axial rolling bearing regains its central position. Thus, the bearing is additionally loaded and can undergo premature wear.

OBJECTS OF THE INVENTION

It is an object of the invention to avoid the mentioned disadvantages and provide a simple configuration of the axial rolling bearing in which, even with an opened bearing, no undesired displacement of the cage and the race disc takes place.

This and other objects and advantages of the invention will become obvious from the following detailed description.

SUMMARY OF THE INVENTION

The invention achieves the above objects in that at least one of the inner peripheral surface and the outer peripheral surface of the cage comprises radially directed elastic projections which bear against the collar under all operating conditions of the bearing so that the cage is radially centered. Due to the elastic projections, the radial play of the axial rolling bearing can be influenced to the point of complete elimination of play or even for establishing a pre-stressed state so that an undesired radial displacement of the cage and the race disc does not take place when the bearing is open.

In one embodiment of the invention, the elastic projections are spaced evenly over the periphery or are configured as a continuous circle on the periphery. While it is true that the manufacturing of a cage with evenly spaced peripheral projections is somewhat more complicated, it has the advantage that friction in the axial rolling bearing is reduced because the total surface contact area between the projections and the collar of the race disc is smaller.

In another embodiment of the invention, the elastic projections correspond to a recess whose volume is at least equal to that of the projections i.e., the elastic projections are configured with an undercut. This has the advantage that the elastic projections can sink into the recess when strong radial forces are active so that the race disc is then guided on the cage diameter.

In still another embodiment of the invention, one of the race discs has an axially directed collar on its outer peripheral surface and the other race disc has an axially directed collar on its inner peripheral surface, the cage comprising elastic projections pointing axially to the right on its outer peripheral surface and elastic projections pointing axially to the left on its inner peripheral surface. It is also possible, according to the invention, to arrange elastic projections pointing alternately to the right and to the left on the inner and/or outer periphery of the cage.

In a particularly advantageous embodiment of the invention, the axially directed collar comprises a radially inwards and/or a radially outwards extending flange, so that an assembled unit consisting of the cage and the disc or discs is formed by positive engagement. An axial rolling bearing with such a configuration offers a great advantage for mounting because its individual components, cage and race disc or discs, cannot fall apart.

It is further possible to configure the flange to extend only over a part of the periphery of the collar or over the entire periphery thereof. If the flange extends over only a part of the periphery of the collar, the elastic projections should extend over the entire periphery of the cage. Alternatively, if the flange extends over the entire periphery of the collar, only individual elastic projections evenly spaced over the periphery of the cage are required.

Finally, the elastic projections may also engage into a groove formed on the collar. This has the advantage that a positively engaged assembly consisting of the cage and the race disc or discs is also obtainable in the absence of lugs or flanges on the collar.

DESCRIPTION OF PREFERRED EMBODIMENTS

Figure 1:
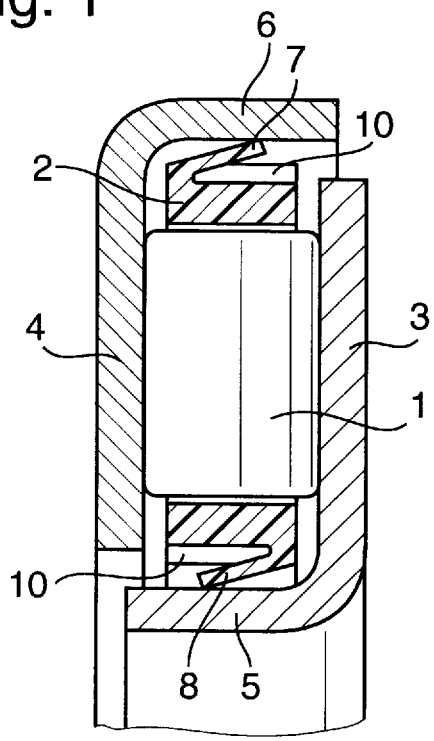
FIGS. 1, 2 and 4 show partial longitudinal cross-sections through an axial rolling bearing of the invention.
Figure 2:
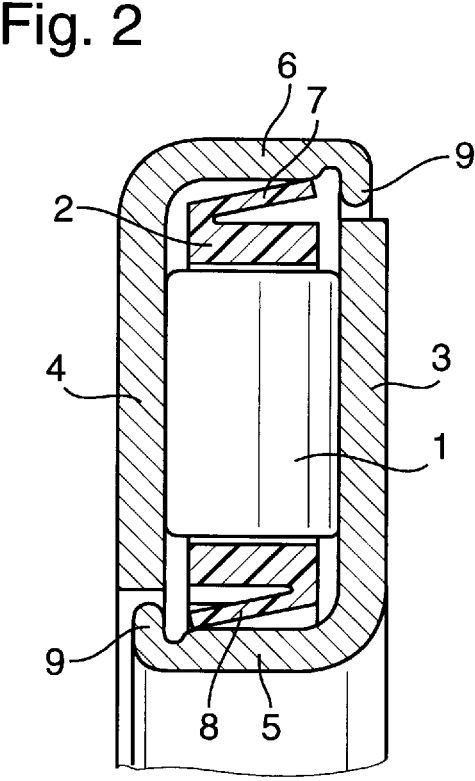

The axial rolling bearing shown in FIGS. 1 and 2 comprises rolling elements 1 disposed in a cage 2 which is arranged between two parallel thin-walled race discs 3 and 4 made preferably of sheet metal. The race disc 3 comprises an axially directed collar 5 on its inner peripheral edge and the race disc 4 comprises an axially directed collar 6 on its outer peripheral edge. According to FIG. 2, the collars 5 and 6 comprise, respectively, a radially outwards extending flange 9 and a radially inwards extending flange 9 so that an assembled unit consisting of the rolling elements 1, the cage 2 and the race discs 3, 4 is formed.

In accordance with the invention, the outer and inner peripheral surfaces of the cage 2 comprise elastic projections 7 and 8 pointing respectively to the right and to the left, said projections 7, 8 being in contact with the collars 6 and 5 respectively. If, for instance, the right-hand race disc 3 is fixed in a housing and a shaft, not shown, lifts off the race disc 4, this race disc 4 will not fall radially inwards because this is prevented by the projections 7 and 8. In other words, the axial bearing always retains its centered position.

As can be seen further in FIG. 1, the elastic projections 7 and 8 are arranged above recesses 10 whose volume corresponds at least to the volume of the projections 7 and 8. This assures that, under certain operating conditions, the projections 7 and 8 can be displaced into the recesses 10 so that the race discs 3, 4 are then guided on the inner and the outer diameter of the cage 2.

Figure 3:
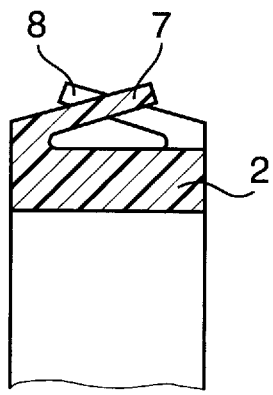
FIG. 3 shows a partial longitudinal cross-section through a cage configured in accordance to the invention.

Finally, FIG. 3 shows a cage 2 having projections 7, 8 which point alternatively to the right and the left.

Figure 4:
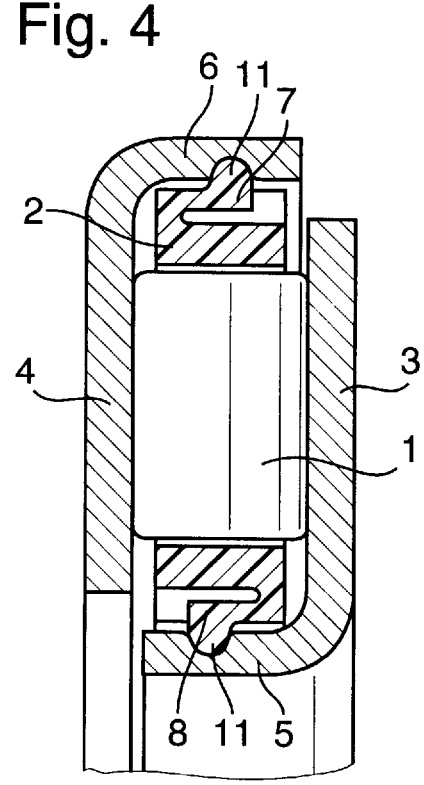

In contrast to the bearing arrangement of FIG. 2, the axial rolling bearing of FIG. 4 is an assembled unit formed by the positive engagement of the elastic projections 7, 8 into grooves 11 extending in the collars 5, 6 so that radially extending flanges 9 or lugs on the collars 5, 6 can be dispensed with.

Various modifications of the cage of the invention may be made without departing from the spirit or scope thereof and it is to be understood that the invention is intended to be limited only as defined in the appended claims.

What we claim is:

1. An axial rolling bearing comprising rolling elements (1) arranged in a cage (2), and at least one race disc (3, 4) which merges at one peripheral edge into an axially directed collar (5, 6) engaging over the cage (2) with play, characterized in that at least one of an inner peripheral surface and an outer peripheral surface of the cage (2) comprises radially directed elastic projections (7, 8) which bear against the collar (5, 6) under all operating conditions of the bearing so that the cage (2) is radially centered.

2. An axial rolling bearing of claim 1 wherein the elastic projections (7, 8) are spaced evenly over a periphery of the cage (2) or are configured as a continuous circle on said periphery.

3. An axial rolling bearing of claim 1 wherein the elastic projections (7, 8) correspond to a recess (10) whose volume is at least equal to a volume of the projections (7, 8).

4. An axial rolling bearing of claim 1 wherein one race disc (4) comprises an axially directed collar (6) on an outer peripheral surface and a second race disc (3) comprises an axially directed collar (5) on an inner peripheral surface, the elastic projections (7) pointing in one axial direction being arranged on the outer peripheral surface of the cage (2) and elastic projections (8) pointing in an opposite axial direction being arranged on the inner peripheral surface of the cage (2).

5. An axial rolling bearing of claim 4 wherein the elastic projections (7, 8) arranged on at least one of the inner peripheral surface and the outer peripheral surface of the cage (2) point alternately in opposite axial directions.

6. An axial rolling bearing of claim 1 wherein the axially directed collar (6, 5) comprises at least one of a radially inwards extending flange (9) and a radially outwards extending flange (9) so that an assembled unit consisting of the cage (2) and the race disc (3, 4) is formed by positive engagement.

7. An axial rolling bearing of claim 6 wherein the flange (9) extends only over a part of a periphery of the collar (5, 6) or as a continuous circle on said periphery.

8. An axial rolling bearing of claim 1 wherein the elastic projections (7, 8) engage into a groove (11) formed on the collar (5, 6).

\* \* \* \* \*